United States Patent
Schuurbiers et al.

(10) Patent No.: US 9,557,187 B2
(45) Date of Patent: Jan. 31, 2017

(54) NAVIGATION SYSTEM AND METHOD FOR PROVIDING DEPARTURE TIMES

(71) Applicant: TomTom International B.V., Amsterdam (NL)

(72) Inventors: Rob Schuurbiers, Rotterdam (NL); Bob Arnold Soeters, Moordrecht (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 14/690,548

(22) Filed: Apr. 20, 2015

(65) Prior Publication Data

US 2015/0226569 A1  Aug. 13, 2015

Related U.S. Application Data

(63) Continuation of application No. 13/063,470, filed as application No. PCT/EP2008/064324 on Oct. 22, 2008, now Pat. No. 9,037,390.

(51) Int. Cl.
  *G01C 21/36*  (2006.01)
  *G01C 21/34*  (2006.01)
  *G06Q 10/10*  (2012.01)

(52) U.S. Cl.
  CPC .......... *G01C 21/36* (2013.01); *G01C 21/3492* (2013.01); *G01C 21/362* (2013.01); *G01C 21/3655* (2013.01); *G06Q 10/1095* (2013.01)

(58) Field of Classification Search
  None
  See application file for complete search history.

(56) References Cited

U.S. PATENT DOCUMENTS

| | | |
|---|---|---|
| 6,178,378 B1 | 1/2001 | Leibold |
| 6,604,047 B1 | 8/2003 | Harris |
| 6,678,613 B2 | 1/2004 | Andrews et al. |
| 6,934,624 B2 | 8/2005 | Deh-Lee |
| 6,950,745 B2 | 9/2005 | Agnew et al. |
| 7,003,398 B2 | 2/2006 | Seligmann |
| 7,031,832 B2 | 4/2006 | Kawasaki et al. |
| 7,085,649 B2 | 8/2006 | Baur et al. |
| 7,321,826 B2 | 1/2008 | Sheha et al. |
| 7,418,340 B2 | 8/2008 | Kasai |
| 7,512,489 B2 | 3/2009 | Endo et al. |
| 7,610,145 B2 | 10/2009 | Kantarjiev et al. |
| 7,702,452 B2 | 4/2010 | Kantarjiev et al. |
| 7,739,040 B2 | 6/2010 | Horvitz |

(Continued)

FOREIGN PATENT DOCUMENTS

| | | |
|---|---|---|
| EP | 0959443 A2 | 11/1999 |
| EP | 0933746 B1 | 1/2003 |

(Continued)

OTHER PUBLICATIONS

International Search Report issued Jun. 29, 2009 for International Application No. PCT/EP2008/064324.

*Primary Examiner* — Calvin Cheung
*Assistant Examiner* — Krishnan Ramesh

(57) ABSTRACT

A navigation system comprises a processing resource configured to receive destination data representative of a destination, to determine an expected travel time to the destination, and to determine a departure time in dependence upon the expected travel time to the destination, and an output device for providing the departure time to a user.

10 Claims, 14 Drawing Sheets

(56) References Cited

U.S. PATENT DOCUMENTS

| | | | |
|---|---|---|---|
| 7,742,873 B2 | 6/2010 | Agnew et al. | |
| 7,801,675 B2 | 9/2010 | Currie et al. | |
| 7,826,965 B2 | 11/2010 | Sadri et al. | |
| 7,869,941 B2 * | 1/2011 | Coughlin | G01C 21/20 701/300 |
| 7,894,981 B2 | 2/2011 | Yamane et al. | |
| 7,908,076 B2 | 3/2011 | Downs et al. | |
| 7,941,133 B2 | 5/2011 | Aaron et al. | |
| 7,941,753 B2 | 5/2011 | Meisels et al. | |
| 8,024,111 B1 * | 9/2011 | Meadows | G01C 21/3492 340/905 |
| 8,103,440 B2 | 1/2012 | Sengoku et al. | |
| 8,103,443 B2 | 1/2012 | Kantarjiev et al. | |
| 8,315,784 B2 | 11/2012 | Endo et al. | |
| 8,332,132 B2 | 12/2012 | Groenhuijzen et al. | |
| 8,433,505 B2 | 4/2013 | Rogers | |
| 8,467,951 B2 | 6/2013 | Husain | |
| 8,521,420 B2 | 8/2013 | Mueller et al. | |
| 8,731,746 B2 | 5/2014 | Weiler | |
| 9,037,390 B2 | 5/2015 | Schuurbiers et al. | |
| 2002/0030698 A1 * | 3/2002 | Baur | G06Q 10/109 715/733 |
| 2003/0060979 A1 | 3/2003 | Andrews et al. | |
| 2003/0135304 A1 | 7/2003 | Sroub et al. | |
| 2004/0073361 A1 * | 4/2004 | Tzamaloukas | G01C 21/3691 701/414 |
| 2004/0181337 A1 | 9/2004 | Kawasaki et al. | |
| 2004/0220768 A1 | 11/2004 | Klein | |
| 2004/0225437 A1 | 11/2004 | Endo et al. | |
| 2005/0010357 A1 | 1/2005 | Deh-Lee | |
| 2005/0021225 A1 | 1/2005 | Kantarjiev et al. | |
| 2005/0080558 A1 | 4/2005 | Kasai | |
| 2005/0096842 A1 | 5/2005 | Tashiro | |
| 2005/0131631 A1 | 6/2005 | Nakano et al. | |
| 2005/0187703 A1 | 8/2005 | Seligmann | |
| 2006/0031007 A1 | 2/2006 | Agnew et al. | |
| 2006/0229807 A1 | 10/2006 | Sheha et al. | |
| 2006/0287810 A1 | 12/2006 | Sadri et al. | |
| 2007/0271031 A1 * | 11/2007 | Jung | G01C 21/3407 701/465 |
| 2008/0004794 A1 | 1/2008 | Horvitz | |
| 2008/0071466 A1 | 3/2008 | Downs et al. | |
| 2008/0086455 A1 | 4/2008 | Meisels et al. | |
| 2008/0140308 A1 | 6/2008 | Yamane et al. | |
| 2008/0195312 A1 | 8/2008 | Aaron et al. | |
| 2008/0234921 A1 | 9/2008 | Groenhuijzen et al. | |
| 2008/0293430 A1 | 11/2008 | Blom et al. | |
| 2009/0030609 A1 | 1/2009 | Orttung et al. | |
| 2009/0043499 A1 | 2/2009 | Endo et al. | |
| 2009/0088971 A1 | 4/2009 | Currie et al. | |
| 2009/0118996 A1 | 5/2009 | Kantarjiev et al. | |
| 2009/0119006 A1 | 5/2009 | Silver et al. | |
| 2009/0204320 A1 * | 8/2009 | Shaffer | G01C 21/3415 701/533 |
| 2009/0210142 A1 | 8/2009 | Couckuyt et al. | |
| 2009/0299623 A1 | 12/2009 | Weiler | |
| 2010/0017110 A1 | 1/2010 | Sengoku et al. | |
| 2010/0268456 A1 | 10/2010 | Kantarjiev et al. | |
| 2011/0301841 A1 | 12/2011 | Schuurbiers et al. | |
| 2013/0345953 A1 * | 12/2013 | Udeshi | G01C 21/00 701/117 |
| 2014/0129142 A1 * | 5/2014 | Kantarjiev | G08G 1/0112 701/533 |

FOREIGN PATENT DOCUMENTS

| | | |
|---|---|---|
| EP | 1439374 B1 | 7/2007 |
| EP | 1909069 A1 | 4/2008 |
| JP | 2004132722 A | 4/2004 |
| JP | 2005195518 A | 7/2005 |
| JP | 2005346478 A | 12/2005 |
| JP | 2007232686 A | 9/2007 |
| WO | 0188480 A1 | 11/2001 |
| WO | 0221351 A1 | 3/2002 |
| WO | 2008038605 A1 | 4/2008 |

* cited by examiner

NAVIGATION SYSTEM AND METHOD FOR PROVIDING DEPARTURE TIMES

CROSS-REFERENCES TO RELATED APPLICATIONS

The present application is a continuation of U.S. patent application Ser. No. 13/063,470, filed on Jul. 25, 2011, which is the National Stage of International Patent Application No. PCT/EP2008/064324 filed Oct. 22, 2008. The entire content of these applications is incorporated herein by reference.

FIELD OF THE INVENTION

The present invention relates to a navigation system and method and the provision of departure times to users of such systems and methods. The invention relates in particular to navigation systems that include portable navigation devices.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

PNDs may be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 920T model manufactured and supplied by TomTom International B.V., provide a reliable means for enabling users to navigate from one position to another. Such devices are of great utility when the user is not familiar with the route to the destination to which they are navigating.

However, in general users have to check road conditions themselves, via media such as television and internet, and estimate when to leave, in order to be at the intended destination on time. The estimation is generally based on information about road congestions such as traffic jams, road works and road closures.

Information that support drivers to estimate themselves how long a trip will take is available from many services. Television teletext shows information about congestions and slow traffic due to traffic jams and road works on highways. There are services which send text messages to mobile devices, concerning traffic problems. There are also subscription services which send text messages to mobile devices about a specific previously user-entered road. Internet services which give information about congestions are available; these services are available to mobile devices by mobile access to internet.

However, the information available from sources mentioned in the preceding paragraph is coarse and may be inaccurate or outdated, and such sources can only be considered as providing general information services. Current methods of estimating appropriate departure times are thus often the result of a rough human interpretation of coarse data.

An alternative method or system for providing an estimation of departure time is desirable.

SUMMARY OF THE INVENTION

According to a first aspect of the present invention, there is provided a navigation system comprising:—a processing resource configured to receive destination data representative of a destination, determine an expected travel time to the destination, and to determine a departure time in dependence upon the expected travel time to the destination; and an output device for providing the departure time to a user.

The system may comprise a portable navigation device, wherein at least one of the processing resource and the output device is included in the portable navigation device.

The processing resource may be configured to monitor the current time, and to provide an alarm signal in dependence upon a comparison between the current time and the departure time.

The output device may be configured to provide an audio and/or visual output to a user in response to the alarm signal.

The processing resource may be configured to receive a desired arrival time, and the determination of expected travel time and/or the determination of departure time may be performed in dependence on the desired arrival time.

The processing resource may be configured to receive user schedule data from at least one user device, and to obtain the destination data and/or the or a desired arrival time from the user schedule data.

The user schedule data may comprise appointment or calendar data, and may be obtained for example from a user schedule application. The user schedule data may further comprise a departure location. The system may be configured to provide user schedule data from the or a portable navigation device to the user device. The user device and the or a portable navigation device may be synchronised.

The processing resource may be configured to select a route from a plurality of possible routes to the destination location in dependence upon expected travel time to the destination location for each of the possible routes.

The processing resource may be configured to determine, for each of a plurality of possible routes to the destination location, a measure representative of the expected reliability of the expected travel time for the route. The processing resource may be configured to select a route in dependence upon the reliability measures for the routes. The reliability measure for a route may comprise the variance of historical speed data for the route. Thus, the processing resource may be configured to select a route in dependence upon the expected reliability of travel time. The safest or most reliable route, which is not necessarily the fastest route, may be selected.

The processing resource may be configured to select a route in dependence upon an appointment importance parameter representative of the importance of an appointment. If the appointment importance parameter has a value greater than a predetermined threshold, the processing resource may be configured to select a route amongst those routes having an expected reliability above a predetermined level.

The expected reliability of expected travel time for the or a route may be determined in dependence upon historic and/or current travel data for the route. The expected reliability of expected travel time may be determined in dependence upon the variance or variances of average speed data.

The processing resource may be configured to add or subtract an offset time to or from the departure time.

The processing resource may be configured to perform the determination of expected travel time and/or the determination of departure time and/or the selection of a route to the destination location and/or selecting the or an offset time in dependence upon the at least one constraint.

The at least one constraint may comprise a requirement to optimise travel time to the destination and/or a requirement to arrive by a required arrival time. The at least one constraint may comprise a requirement to depart and/or arrive within at least one time window.

The processing resource may be configured to receive travel data, and/or the determination of the expected travel time may be performed in dependence upon the travel data. The travel data may be representative of previous travel along the selected route or part of the selected route. The travel data may comprise measured travel data, for example historic travel data and/or current travel data, and/or may comprise predicted travel data. Each of the current travel data, the historic travel data and the predicted travel data may comprise at least one of traffic data, weather data and event data.

The processing resource may be configured to vary the use of historic travel data and/or current travel data and/or predicted travel data in determination of expected travel time, in dependence upon the current time.

The use of historic travel data and/or current travel data and/or predicted travel data in determination of expected travel time may be selected in dependence upon the difference between the current time and the or an expected or estimated departure time, periodically and/or in dependence upon receipt of travel data.

The system may further comprise a user input device for user input of at least one of destination location, desired arrival time, offset time and departure location.

The processing resource may be configured to update the determination of departure time, and may be configured to update the determination of departure time.

In another independent aspect of the invention there is provided a method of operation of a navigation apparatus comprising:—receiving destination data representative of a destination location at the navigation apparatus; determining an expected travel time to the destination; and determining a departure time in dependence upon the expected travel time to the destination; and providing the departure time to a user.

In a further independent aspect of the invention there is provided a portable navigation apparatus comprising:—a memory for storing a departure time; a processing resource for monitoring current time and providing an alarm signal in dependence upon a comparison between the current time and the departure time; and an output device for providing an output to a user in response to the alarm signal.

In another independent aspect of the invention there is provided a computer program product comprising computer readable instructions executable to put into effect a method as claimed or described herein.

In one mode of operation of the system, the processing resource has information about where the user is (the source). The user is able to input where she wants to go (the destination) and at what time she wants to be there (the destination time). Travel data may be obtained from another system or source. The processing resource may be configured to calculate the fastest route from the source to the destination, taking into account the current travel times. The processing resource may also be configured to calculate the total travel time for the fastest route. The processing resource may also be configured to subtract the total travel time and a margin from the destination time; this is the "time to leave". The processing resource may be configured to notify the user of the time to leave when the current time is close or equal to the time to leave.

Where the user wants to go and at what time she wants to be there can also be provided to the processing resource from a user's personal information management software (for example, Microsoft Outlook, Google Calendar).

The processing resource may be integrated in a mobile device, which may communicate with other devices or systems to get accurately measured travel times, over the air. The user may interact with the device and obtain notifications from the device. Notifications may be audio and/or video notifications. User interaction with the device may also be performed through a connection to a user's personal information management system (for example Microsoft Outlook or Google Calendar), which may supply agenda events. The system may be used by any road user or other traveler, and may be particularly useful in planning business trips or organising travel to business appointments. The system may also be used by commercial drivers and delivery services. For example, fleet management systems use GPS systems and contracts and details of delivery times and locations are usually stored in a central database. The system can be configured to co-operate with the database and with user devices to provide departure alarms for selected users to depart for a particular delivery. Similarly, the system may be used by taxi firms to alert drivers or dispatches of the departure time to pick up a client, for example so as to arrive at a desired destination at a desired time (for example to arrive for a flight or a train). The alarm may be provided to a commercial vehicle driver (for example a taxi, coach or lorry driver) and/or to a dispatcher.

Any feature in one aspect of the invention may be applied to other aspects of the invention, in any appropriate combination. In particular, apparatus features may be applied to method features and vice versa.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
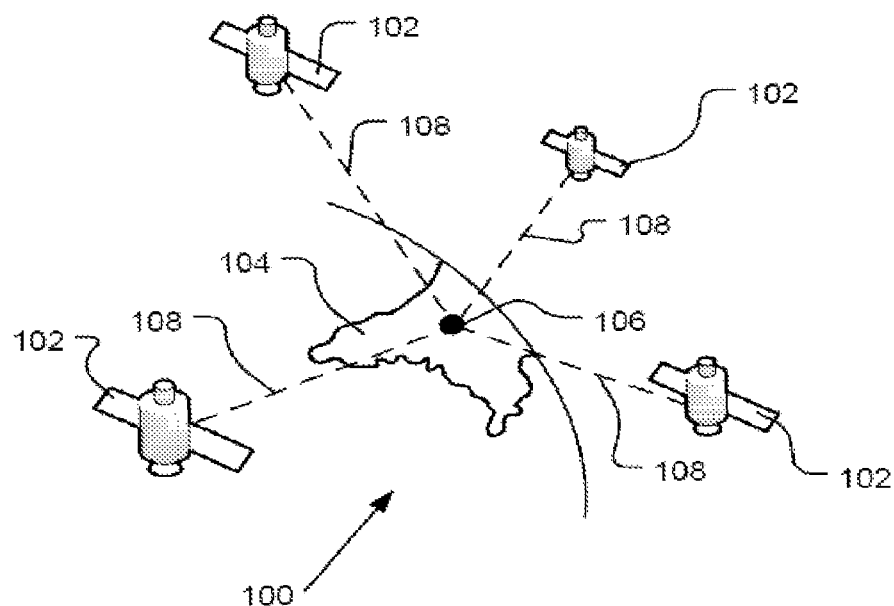
FIG. 1 is a schematic illustration of an exemplary part of a Global Positioning System (GPS) usable by a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It will also be apparent from the following that the teachings of the present invention have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
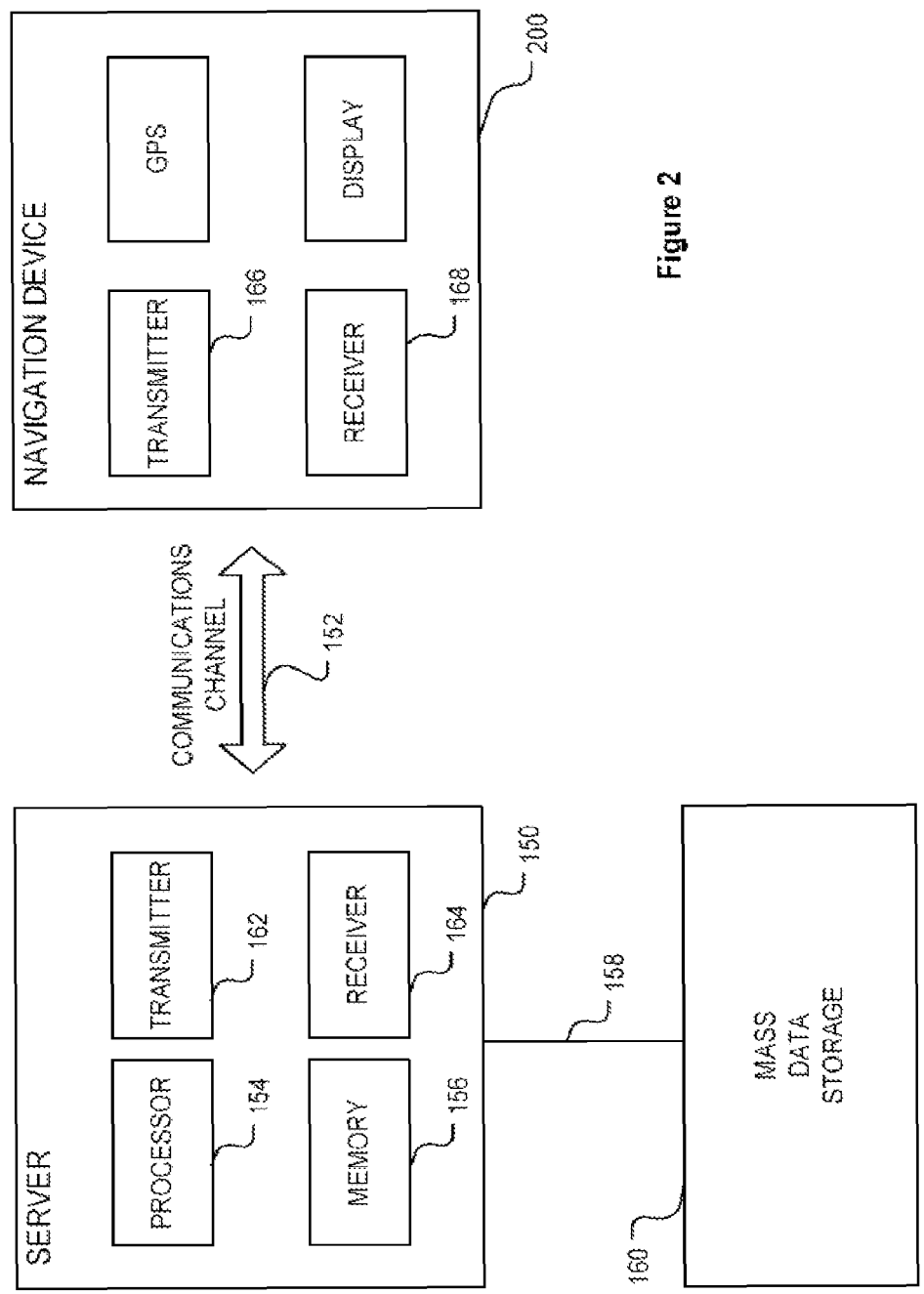
FIG. 2 is a schematic diagram of a communications system for communication between a navigation device and a server.

Turning to FIG. 2, a navigation device 200 comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an internet connection between the server 150 and the navigation device 200.

The navigation device 200 may be provided with information from the server 150 via information downloads which may be periodically updated automatically or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
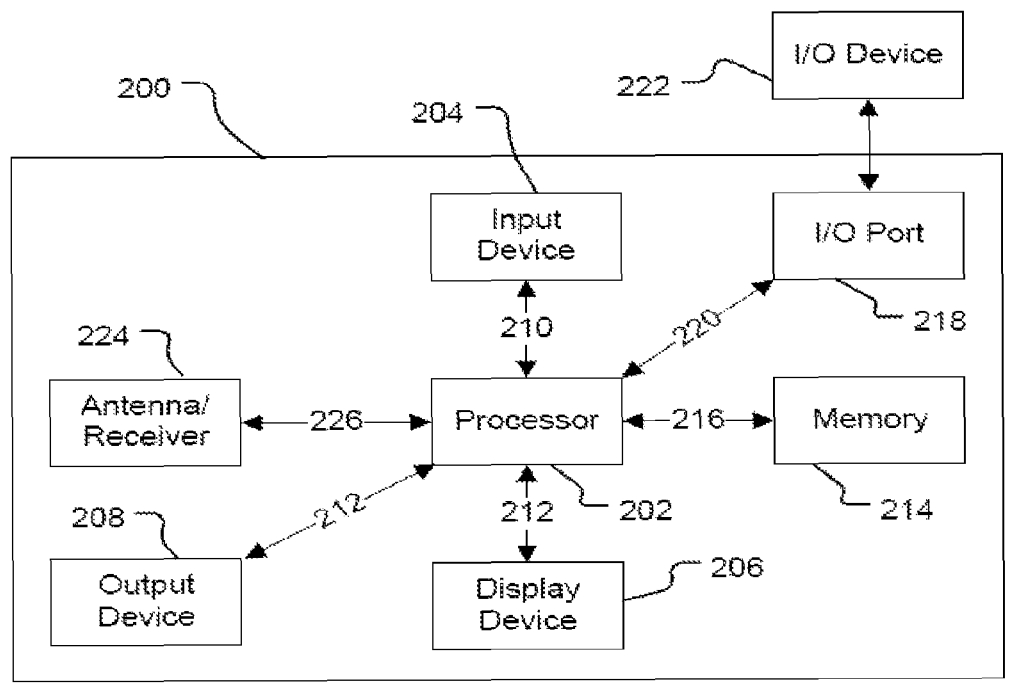
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes a processing resource comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it is should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectable to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use.

Figure 4:
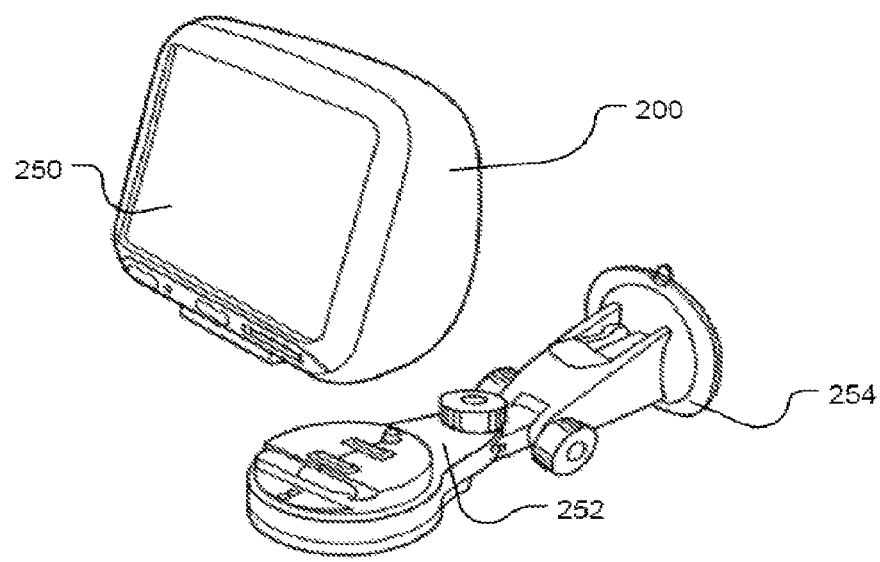
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the microprocessor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
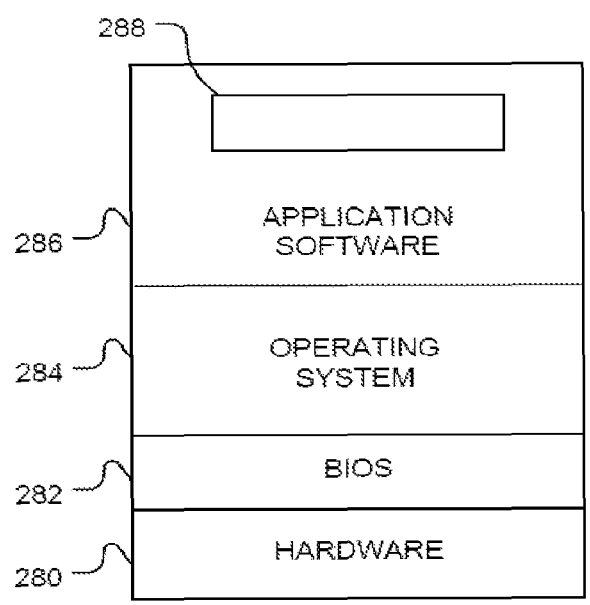
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the above described route planning and navigation functionality) can run. The application software 286 provides an operational environment including the GUI that supports core functions of the navigation device, for example map viewing, route planning, navigation functions and any other functions associated therewith. In this respect, part of the application software 286 comprises a view generation module 288.

Figure 6:
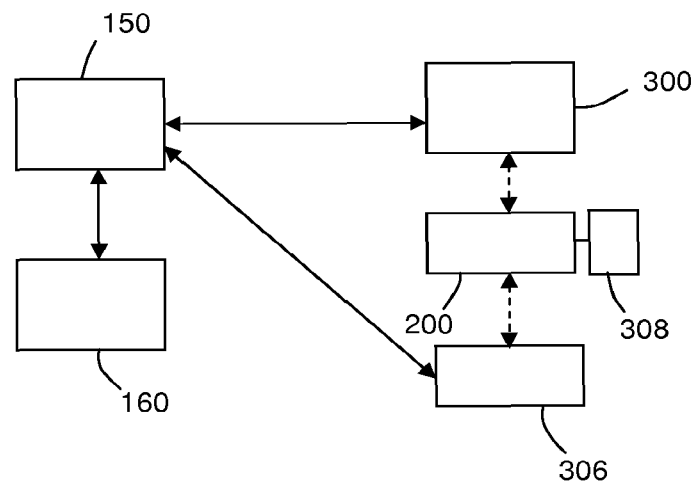
FIG. 6 is a schematic diagram of a system that is able to notify a user of a departure time for a journey.

An embodiment of the system that is configured to estimate appropriate departure times to enable a user to arrive at a desired destination at a desired arrival time is shown in FIG. 6.

The embodiment comprises a navigation device 200 that is connectable to a docking station associated with a local server or platform 300, for example present in a user's home. The local server or platform 300 is in turn connected to the server 150 via an internet connection.

The navigation device 200 is also connected to an alarm 308, and is connectable to a user device 306, in this case a mobile telephone, via a digital connection, in this case a Bluetooth connection.

In operation, docking of the navigation device 200 at the docking station enables charging of the navigation device 200 and the sending of data between the navigation device 200 and the local server or platform 300, and between the navigation device 200 and the server 150 via the local server. Data may also be sent between the navigation device 200 and the server 150 via the user device 306 as described above in relation to FIG. 2.

Figure 7:
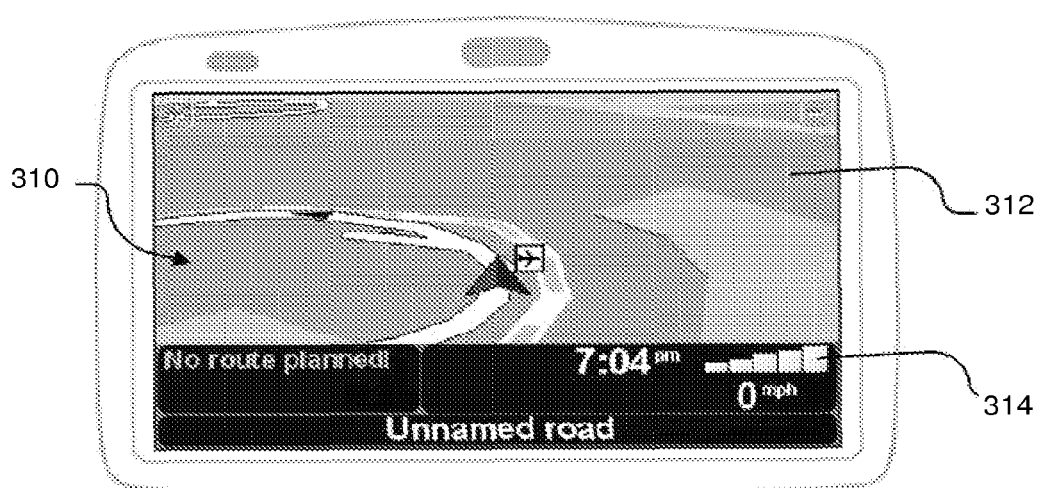
FIG. 7 is a diagram representing a screen displayed to a user on a display in operation of the system of FIG. 6.

When a user switches on the navigation device 200, the device 200 acquires a GPS fix and calculates (in a known manner) the current location of the navigation device 200. The user is then presented, as shown in FIG. 7, with a display 310 showing in pseudo three-dimensions the local environment 312 in which the navigation device 200 is determined to be located, and in a region 314 of the display 310 below the local environment a series of control and status messages.

Figure 8:
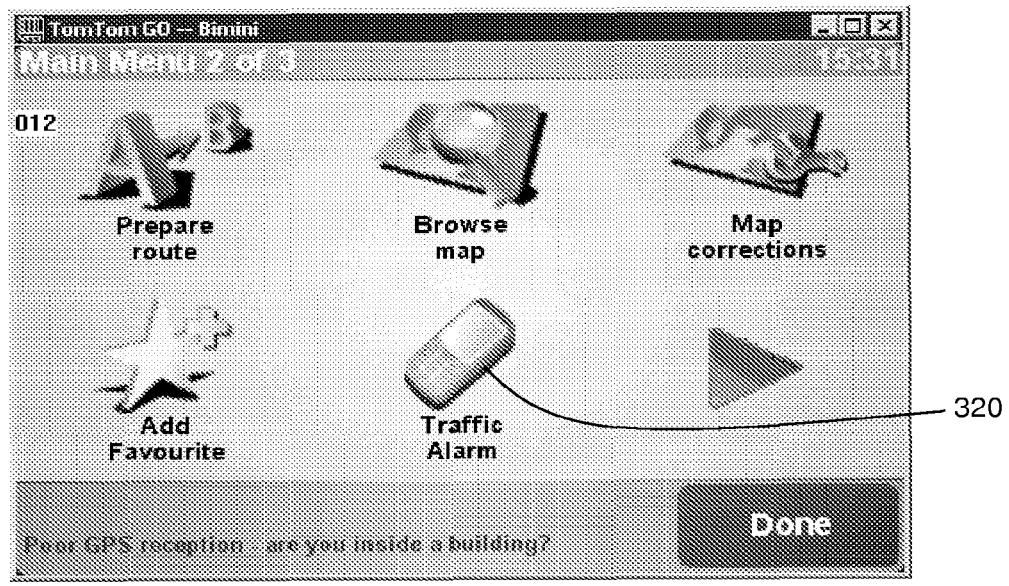
FIG. 8 is an illustration of a main menu.

By touching the display of the local environment 302, the navigation device 200 switches to display (as shown in FIG. 8) a series of virtual or soft buttons represented by icons by means of which a user can input a destination to which they wish to navigate, and perform various other functions relating to control of the navigation device 200 or display of data on the display 310.

It can be seen that one of the buttons 320 relates to a traffic alarm function. The traffic alarm function enables the input of destination data representing locations that a user is scheduled to visit, and desired or required arrival times.

Figure 9:
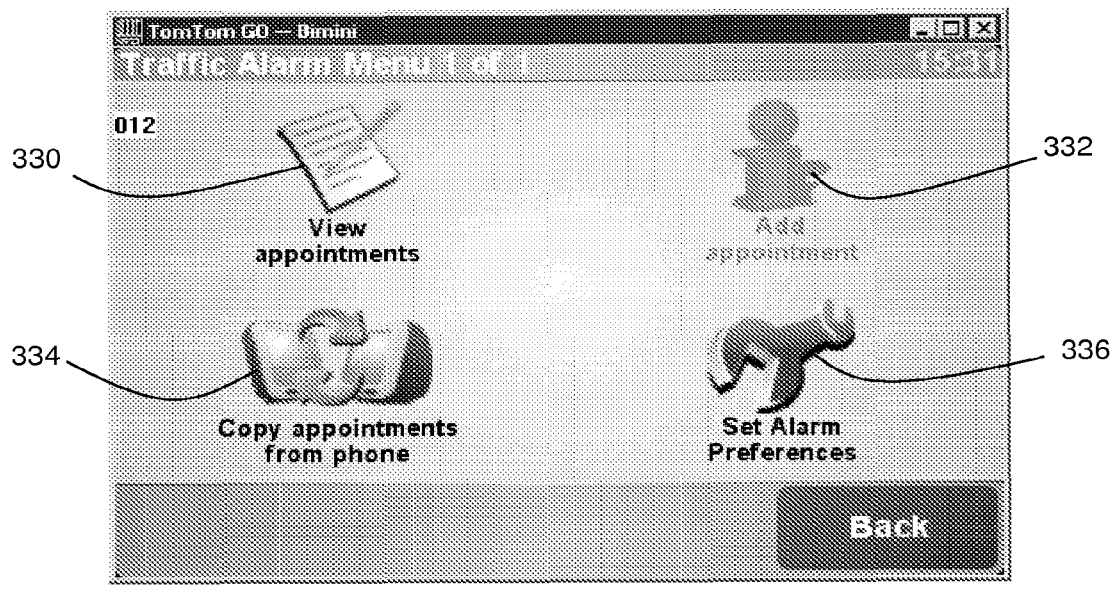
FIG. 9 is an illustration of a traffic alarm menu
Figure 10:
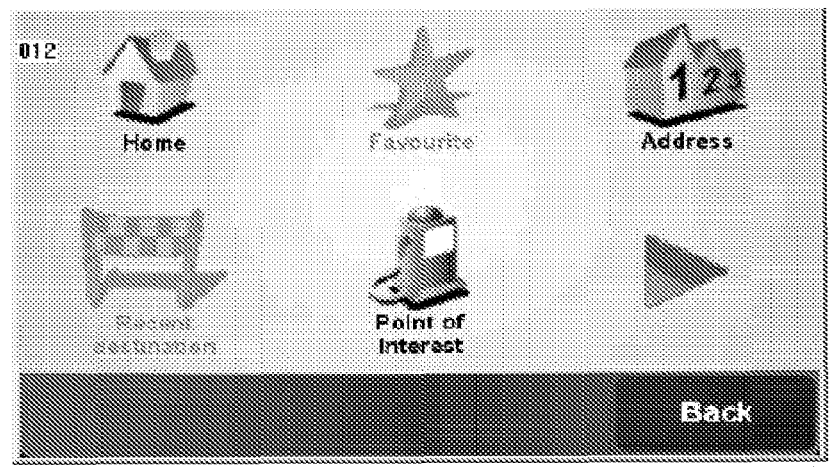
FIGS. 10, 11 and 12a to 12c are illustrations of menus for input of a destination by a user.
Figure 11:
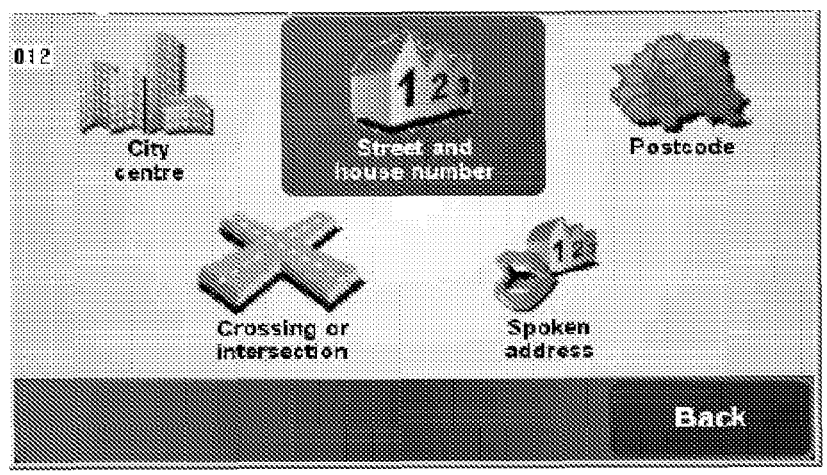
Figure 12A:
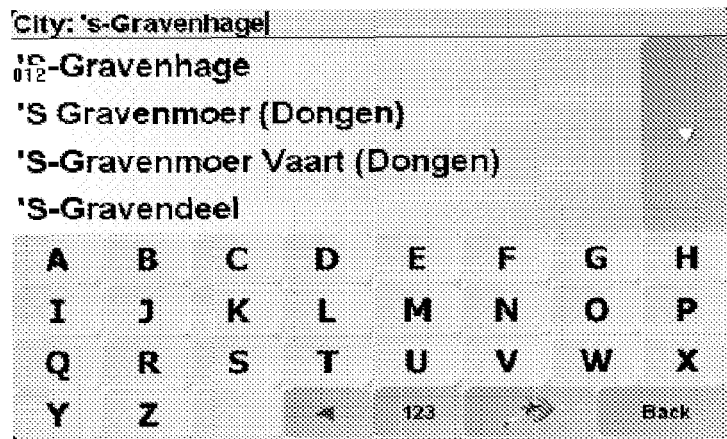
Figure 12B:
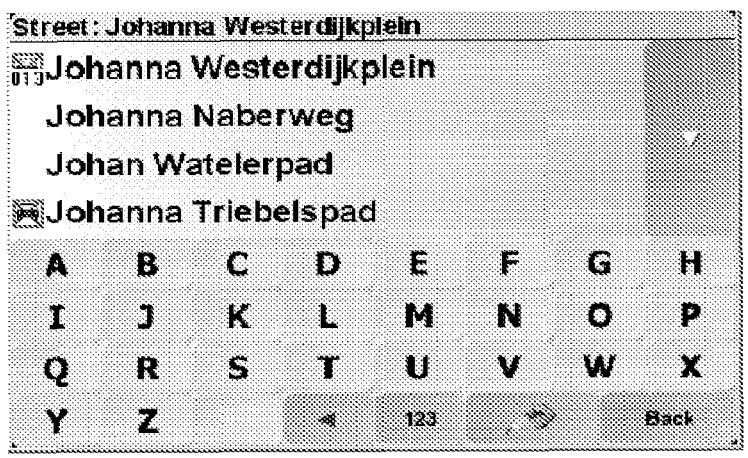
Figure 12C:
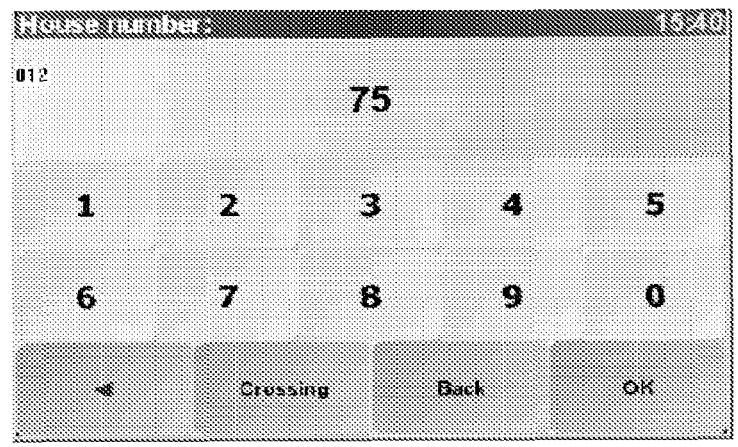

If the traffic alarm button 320 is pressed by the user, a further series of buttons shown in FIG. 9 is displayed on the display 310. The buttons are a view appointments button 330, an add appointment button 332, a copy appointments from phone button 334 and a set alarm preferences button 336.

If the add appointment button 332 is pressed then a series of interlinked user input screens shown in FIGS. 10, 11 and 12a to 12c can be accessed by the user. The user input screens enable a user to enter a destination. The destination can be entered as an address, or selected from a lists of points of interest, favourite destinations, or recent destinations, or the destination can be set as the user's home address, via further input screens that may be selected using the buttons shown in FIG. 10. FIGS. 11 and 12a to 12c illustrate an example in which a user enters an address based on street and house number (in this case 75 Johanna Westerdijkplein, Gravenhage). The address can also be entered as a city centre location, a postcode, a crossing or intersection or via a spoken command by the user as indicated by the buttons shown in FIG. 11.

Figure 13:
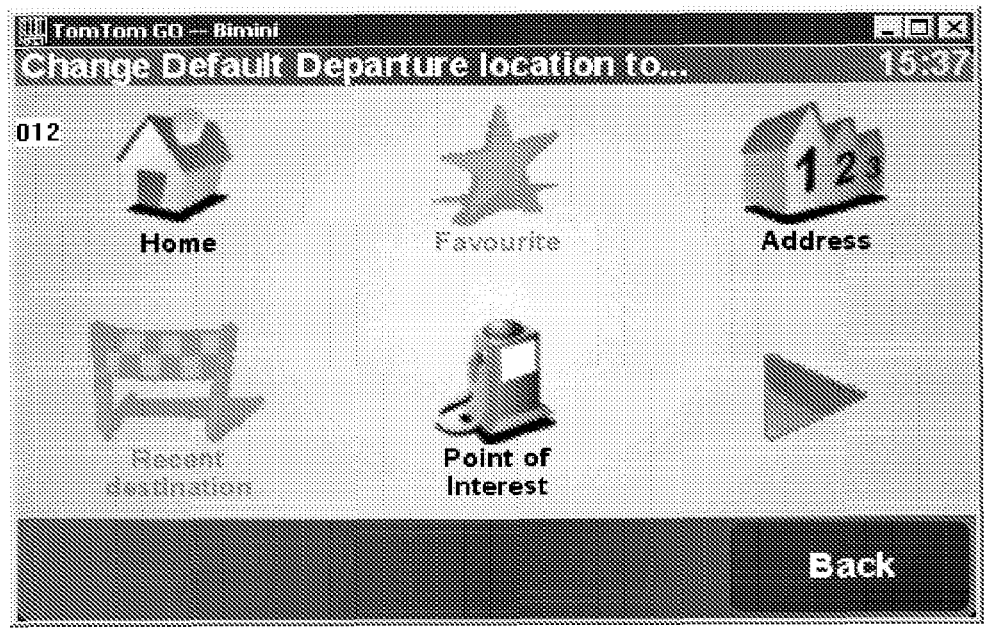
FIGS. 13 and 14 are illustrations of menus for input of a departure location by a user.
Figure 14:
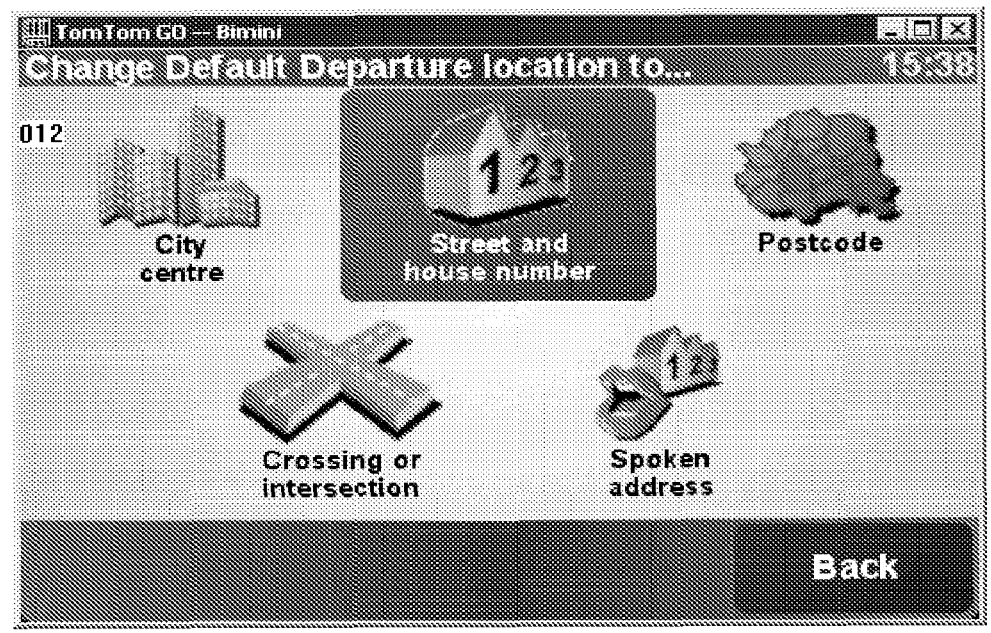

User input screens also enable a user to enter a departure point for the journey to the selected destination. The user input screens for entering a departure point are equivalent to those used for entering a destination, and example of the user input screens are shown in FIGS. 13 and 14. If the user does not enter a departure point, then the current location is used as the departure point. In general, as the current location may change, that requires that the travel time and departure must subsequently be recalculated periodically and/or in response to a change in location of the navigation device 200.

The user is also able to enter a desired arrival time at the destination using a further user input screen (not shown). The desired arrival time and the destination are stored in the memory 214 of the navigation device 200.

The processor 202 of the navigation device 200 is configured to select a route to the destination and to determine a departure time for the journey to the destination that should enable the user to arrive at the destination by the desired arrival time.

The processor 202 pre-selects a set of possible routes to the destination, using known techniques, and then calculates an expected travel time to the destination. In the default mode of operation, the processor 202 then selects the route that provides the shortest expected travel time and calculates a departure time. The departure time is calculated by subtracting the expected travel time and an additional offset time from the desired arrival time.

Figure 15:
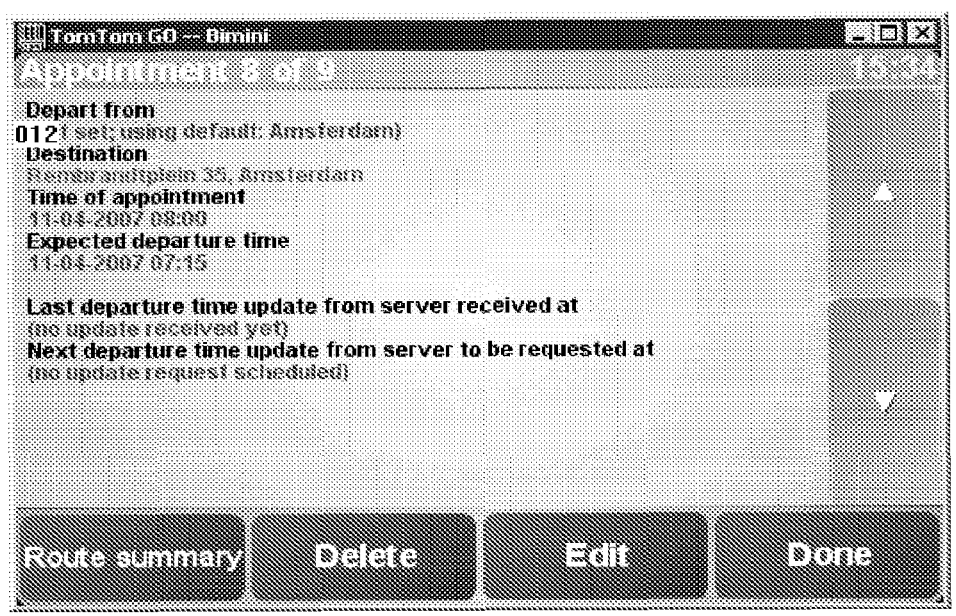
FIG. 15 is an illustration of an appointment screen.

The departure time is stored in the memory 214 together with the departure location as an appointment. Each stored appointment can be viewed by the user on a appointment screen 350 shown in FIG. 15, which can be accessed via the view appointments button 330 shown in FIG. 9.

The processor 202 monitors the current time using an internal clock (not shown) and when the current time matches a stored departure time the processor 202 generates an alarm signal and passes the alarm signal to the alarm 308, which generates an audible and/or visual alarm to the user. Alternatively or additionally, the alarm signal may be passed to the display 310 causing it to flash and/or to display a departure message to the user. The departure time may also be displayed on the display 310 in advance of the departure time, continuously, periodically or on command of a user. In one mode of operation a countdown to the departure time is displayed, for example "You should depart within the next x minutes".

Figure 17:
FIG. 17 is an illustration of a screen for inputting, displaying and modifying an offset time.
Figure 18:
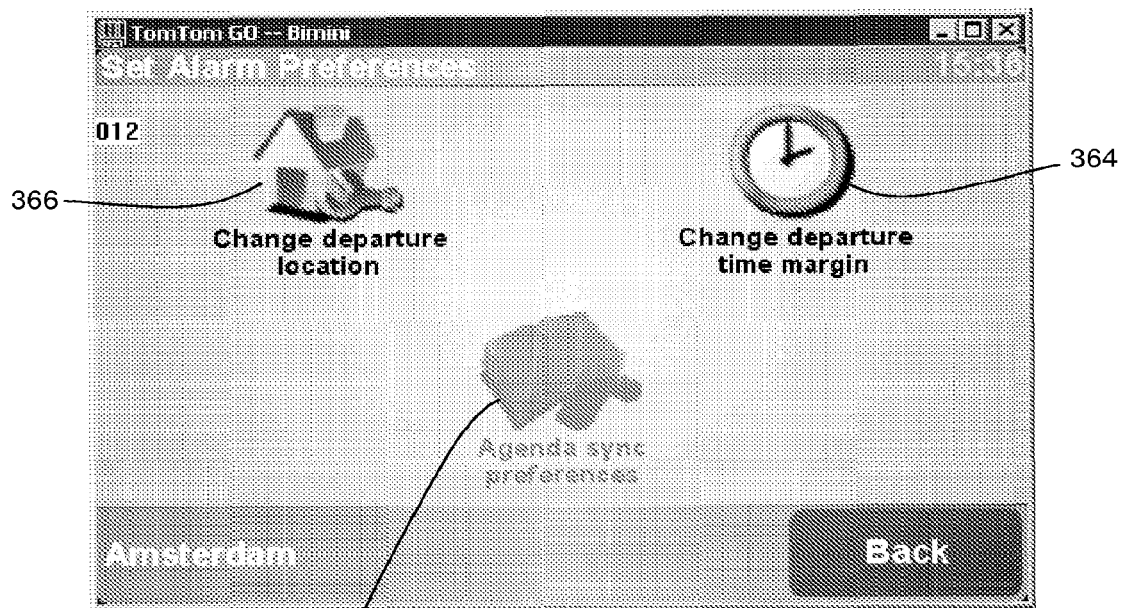
FIG. 18 is an illustration of an alarm preferences menu.

The offset time is intended to compensate for any unforeseen delays that may occur en route, to allow time for the user to prepare themselves for departure, and, in some circumstances, to enable the user to arrive slightly in advance of the desired arrival time. The offset time is preset at a default value, for example 15 minutes, but the user is able to alter the offset time via the input screen 360 shown in FIG. 17. The input screen 360 may be accessed via a change departure time margin button 364 in a set alarm preferences screen 362 shown in FIG. 18 that in turn may be accessed via the set alarm preferences button 336 shown in FIG. 9. The set alarm preferences screen 362 also includes a change departure location button 366 and an agenda sync preferences button 368, whose function is discussed in more detail below.

In a variant of the embodiment, a plurality of different offset times are provided, resulting in a plurality of departure or pre-departure times and different messages or signals are provided to the user as the current time matches each departure time or pre-departure time, for example "depart in 15 mins", "depart in 5 mins", "depart now" accompanied by an audible alarm.

In one example of a departure notification process, a user inputs data that informs the processor 202 that at time x the user wants to be at location B, having traveled there by car using the fastest route with a margin of margin minutes. The margin time in this example specifies the time gap desired by a user between the issue of a departure message and the calculated departure time. The processor 202 continuously monitors traffic information and the location A of the user, calculates travel and departure times, and provides an output message to the user at the appropriate moment based on the departure time and the margin, stating that "To be at location B at time x from location A, using a car, using the fastest route with current travel time N, you should leave in at most margin minutes, at time M", where (M=X−N).

Figure 16:
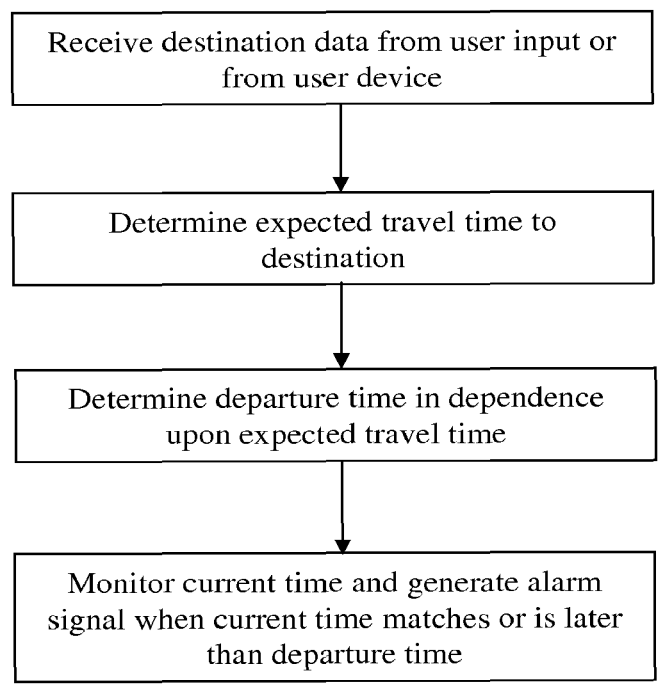
FIG. 16 is a flow chart illustrating in overview a departure alert process.

The departure alarm process performed by the embodiment in one mode of operation is illustrated in overview in the flow chart of FIG. 16. The embodiment is able to plan trips and get automatic notification when it is time to leave, in order to get to an intended destination on time.

The expected travel time for the or each route is calculated in dependence on one or more of speed/distance data (also referred to as predicted data), historic travel data, and current travel data.

A speed/distance calculation for a particular route obtains the length of each leg of the route (for example, each stretch of road between successive nodes or junctions), assigns a predicted speed of travel for that leg in dependence on road type (for example, 30 km/hour for a minor, urban road, 60 km/hour for an arterial, urban road, 90 km/hour for a motorway) and sums the expected times of travel for each leg of the route based on the length and expected speed for each leg. More categories of road can of course be provided than those mentioned in the preceding paragraph, and different predicted speeds provided for each category. Furthermore, predicted speeds can be varied in dependence upon time of day, weather conditions and/or the occurrence of traffic problems or events, that may cause delays. The predicted travel time for a route is then determined in dependence on the predicted speeds and any predicted delays.

Figure 19:
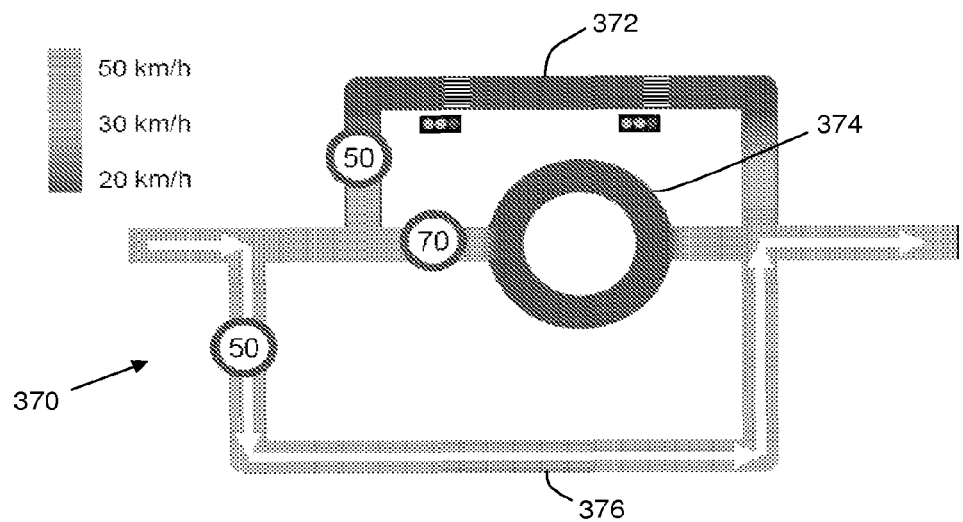
FIG. 19 is a schematic illustration of part of a traffic network, with average speeds indicated by shading.

It has been found that in reality speeds vary between roads. For example, a part 370 of a travel network is illustrated schematically in FIG. 19 and average speeds at a particular time on weekday are indicated by the level of shading. It can be seen that the average speeds for the legs 372, 374 are lower than for leg 376 despite legs 372, 374 having the same or higher speed limit (50 km/hour or 70 km/hour) than the leg 376 (50 km/hour). In this case, the variation of average speeds may be due to the presence of additional road features, for example the roundabout and traffic lights shown in the figure. In practice, average speeds can also vary based on other factors for example usage level of a particular road.

In light of the variation in speeds that can be found for different legs of a traffic network, historic travel data that comprises actual measured average speed data for each leg of a traffic network can provide an accurate speed estimate. The average speed data is provided as a function of time of day, and day of the week. An example of a plot of average speed as a function of time of day and different days of the week for one leg of a traffic network is provided in FIG. 20. Historic travel data can be obtained from anonymous GPS data logged by PND users. Usually such GPS data is logged every five seconds by each PND and later transmitted back to the server (anonymously and subject to permission from the user) via the internet when the PND is docked in a home platform (for example a local server or platform 300 as shown in FIG. 6). In the case of the embodiment described herein the historic data comprises historic speed profiles as used in the TomTom IQ Routes® system. In some cases, historic travel data may not be available for particular parts of a route. In that case, a mixture of historic and predicted data can be used, with predicted data being used for those parts of a route where no historic travel data is available.

Current travel data provides an indication of the current travel conditions. In the example described herein the current travel data comprises average speed data for different legs of a traffic network gathered over a short, recent time window (for example, a 30 minute window within the last hour). The average speed data can be obtained from anonymous GPS data obtained from mobile phones associated with registered PND users, for example using the TomTom HDTraffic® system. Current travel data can also comprise data relating to weather or other environmental condition, or warning data concerning roadworks or events, each of which may cause a variation in traffic speeds.

In the embodiment of FIG. 6, the current travel data and the historic travel data are stored at the server 150 and provided to the navigation device 200 either via communications channel 152 or (when the navigation device 200 is docked) via the local server or platform 300. The current travel data is updated and provided to the local server or platform 300 and/or the navigation device 200 periodically.

In one mode of operation, the data that is used by the embodiment to calculate the expected travel time is selected in dependence upon the current time, and the difference between the current time and the likely departure time.

For example, if the current time is significantly in advance of the likely departure time (for example 12 hours or more) then historic data comprising average speeds for the day of the week and likely departure time are used to calculate travel time for a route. If historic travel time is not available for a particular leg of a route then the travel time for that leg is calculated using predicted data. In one variant, an initial departure time calculation is performed using standard speed/distance data to obtain an initial travel time and an initial likely departure time, that initial likely departure time is used to select the historic average speed data for a particular time of day to be used, and the travel time is recalculated in an iterative procedure using the selected historic average speed data.

As the departure time approaches, the current travel data becomes more significant. When the calculated departure time is within a predetermined threshold (for instance within two hours of the current time) the travel time and the departure time are recalculated in dependence upon the current travel data. The travel time and the departure time are then recalculated periodically, or upon receipt of new travel data, up until the departure time. The recalculation procedure usually comprises recalculation of travel time for each route and reselection of the route to be used (unless the user has specified a particular route) as the fastest or otherwise most suitable route may change depending on travel conditions. Thus, the route to the destination can vary based on travel time delays (measured in real time or predicted). Travel data is monitored either for all routes, or for routes within a selected corridor between the point of departure and the destination. The generation of the alarm signal can thus be based on the estimated time of arrival using a selected route to the destination and using potential alternative routes to the destination.

Figure 21:
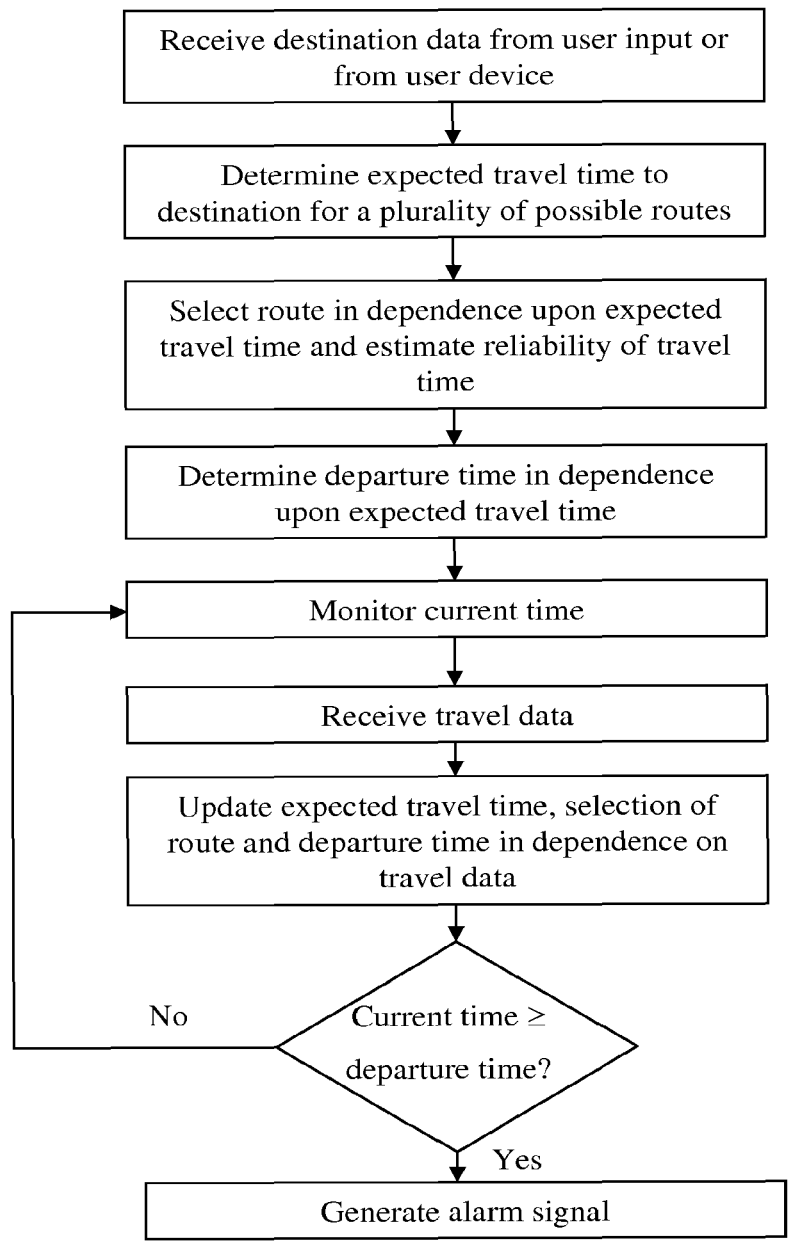
FIG. 21 is a flowchart illustrating in overview a departure alert process.

A mode of operation in which the route, expected travel time, and departure time are updated in dependence on travel data is illustrated in overview in the flow chart of FIG. 21.

User schedule information may be received from a user device 306 as well as by way of entry via the user input screens. For example, the navigation device, is able to communicate with the user device 306, via Bluetooth or other communication protocol, enabling the transfer of data between the navigation device 200 and the user device. The user device 306 illustrated in FIG. 6 is a mobile phone but it may also be, for example, a personal digital assistant (PDA), personal computer, or any other type of user device operating a suitable communication protocol.

A user is able to select the appointment or other schedule data from a mobile phone or other user device via user selection screens (not shown) obtained by operation of the copy appointments from phone button 334 of the traffic alarm menu screen of FIG. 9. Operation of the button 334 causes display of a list of registered user devices (which may be registered via user input screens obtained via operation of the set alarm preferences button 336). The user selects one or more of the registered user devices and either downloads all appointment or other schedule data from the selected user device to the navigation device 200 or browses, selects and downloads particular appointment or other schedule data from the selected user device 306 to the navigation device 200.

In the embodiment of FIG. 6, the navigation device operates under a Linux operating system and is able to synchronise data from Outlook and Google Calendar applications running on the user device. However, the navigation device may be configured to synchronise data with any suitable user schedule application.

Figure 22:
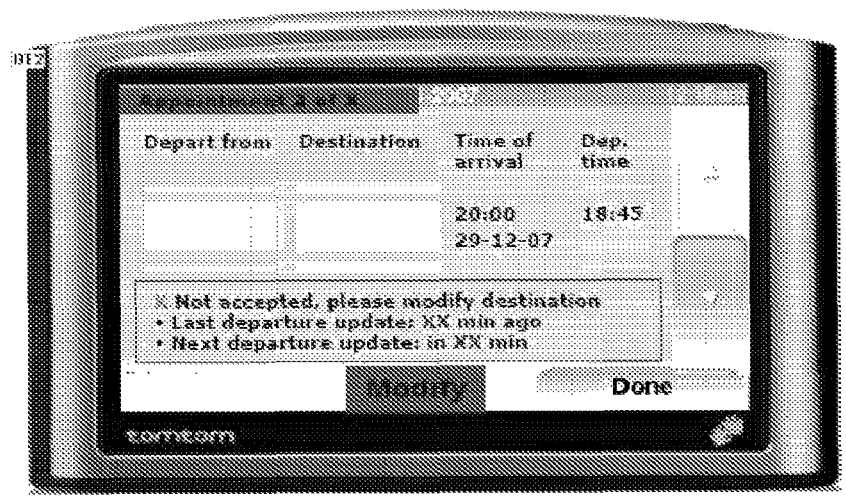
FIG. 22 is an illustration of an appointment list screen.

Downloaded appointments can be viewed and modified by the user using the appointment list screen shown in FIG. 22. In the example shown in FIG. 22, the destination data does not match a destination recognised by the navigation device 200 and the user must modify the destination. The user is also able to modify the appointment time, or a desired arrival time for the appointment via the appointment list screen, and to enter a departure location. Once an appointment has been downloaded and recognised the processor 202 determines a route to the appointment location, determine a departure time and provide a departure alarm as described above in relation to FIGS. 6 to 21

Appointment data can also be transferred from the navigation device 200 to the user device 306. Thus, appointment or other schedule or calendar data can be synchronised between the navigation device 200 and the user device 306. Calculated departure times can also be transferred to the user device 306. In order to ensure consistent treatment of appointment or other schedule data, a unique identifier is provided for each appointment or other schedule entry. Furthermore, device identifiers are associated with each appointment or other schedule entry identifying the devices on which the entries are stored.

In the modes of operation described above in relation to FIGS. 6 to 22, the route to the destination that is selected is the route having the shortest expected travel time. In alternative modes of operation, additional constraints are applied to the selection of a route, the determination of travel time and departure time, and/or to the selection of an offset time.

For example, in some circumstances reliability of arrival time is more important that speed of travel, such as when an appointment is particularly important or when a user is travelling to take a flight, train or other scheduled transport. In such circumstances, a route may be selected (and departure time calculated accordingly) by the processor 202 in dependence upon the expected reliability of the expected travel time for each possible route. The processor 202 may also select a larger offset time than usual in such circumstances.

The reliability of expected travel time is determined from historic travel data. For example, the variance of measured, historic speed data for each leg of a traffic network can be obtained from the historic travel data and used as a measure of reliability. The reliability of a particular route can also be modified in dependence on current travel data and/or event data. For example, if current travel data indicated that there had been traffic flow problems on a usually reliable route earlier in the day then the reliability of the route could be temporarily downgraded (for example, until the next day). It is possible for the user to select the safest route to arrive in time based upon historic speed data along potential routes to the destination. The safest route is usually the route with the lowest variance in speed, and thus having the lowest risk of providing any delays.

The user is able to specify whether an appointment is of high importance, and in that case the processor 202 selects a route only from amongst routes having a reliability level above a predetermined threshold.

In another mode of operation, rather than selecting a precise desired arrival time at a destination the user is able to specify a time window within which they wish to depart or arrive, and the processor 202 then selects a departure time within the departure time window or selects a departure time so as to provide expected arrival during the arrival time window.

Figure 20:
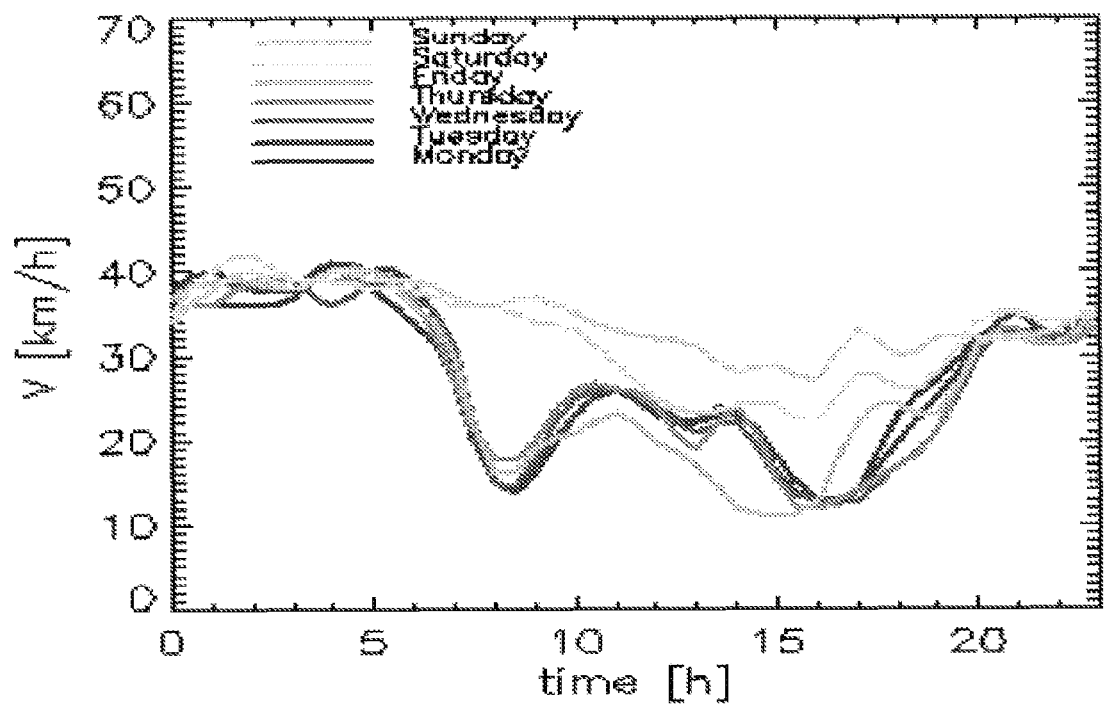
FIG. 20 is a graph of average speed as a function of time of day, and day of week for a leg of a traffic network.

The processor 202 may select a departure time in order to optimise travel time based upon historic or current travel data. For example, it can be seen from FIG. 20 that there are times during each day when average speeds for the leg that is the subject of FIG. 20 are higher than at other times. In a simple example, if a user wished to travel from one end of the leg to the other and specified a departure or arrival time window of, say, Monday morning between 8 am and 12 pm, the processor 202 would select a departure time of around 10.30 am as expected travel speeds would be expected to be highest (and thus travel time would be expected to be lowest) at that time. In another example, if the user specified a departure or arrival time window covering any time or day of the week, the processor 202 would select a departure time of around 2 am on Sunday morning.

In reality most journeys would comprise multiple legs, and in such cases the processor 202 would process historic travel data for each leg, and would usually consider more than one route, in order to calculate a route and departure time that optimised expected travel time.

In the embodiments described above, in relation to FIGS. 6 to 22, the processor 202 of the navigation device 200 carries out processing operations relating to departure time and departure notifications. In variants of the embodiments, the processing is carried out by the local server or platform 300 and/or by the server 150 either solely or jointly with the navigation device 200. Resulting departure time data representative of a departure time is transferred from the server 150 and/or local server or platform 300 to the navigation device 200 via link 152 or via the local server or platform 300. The navigation device 200 then monitors the current time and generates the alarm signal in dependence upon a comparison between the current time matches and the departure time.

In the embodiments described above, the travel time and departure time is determined for travel by car. In variants of the embodiments, the user is also able to specify other forms of transport, for example lorry, coach, bicycle or travel by foot. The processor 202 is configured to adjust expected speeds, and thus travel and departure times, in dependence on the specified form of transport. In the case of cycling or travel by foot a basic distance/speed calculation may be performed rather than a calculation based on historic or current travel data. In the case of travel by coach or lorry, the speeds used in the calculation of travel and departure times can be reduced by an offset amount or factor, to account for the expected reduction in speed compared to travel by car.

The described embodiments are able to provide the ability to plan a trip, based on accurately measured, current travel times and current road conditions. They are able to provide a notification when it is time to leave, in order to get to an intended destination at a specific time, given the current traffic information.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the present invention may be exemplified as a portable navigation device, it would be appreciated that route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation system, comprising:
   a processing resource; and
   an output device for providing a departure time to a user, wherein the processing resource is configured to:
   receive user schedule data from at least one user device, and to obtain destination data representative of a destination and a desired arrival time from the user schedule data;
   determine a plurality of possible routes to the destination and an expected travel time to the destination for each of the plurality of routes in dependence upon historic travel data, wherein said historic travel data comprises measured average speed data at different times;
   select a route from the plurality of possible routes to the destination, the selected route having the shortest determined expected travel time to the destination;
   determine a departure time in dependence upon the expected travel time to the destination using the selected route such that the user arrives at the destination by the desired arrival time;
   recalculate the expected travel time for each of the plurality of routes in dependence upon current travel data when the determined departure time is within a predetermined threshold of the current time, wherein the current travel data is indicative of current travel conditions;
   reselect a route from the plurality of possible routes to the destination, the selected route having the shortest recalculated expected travel time to the destination;
   update the departure time in dependence upon the recalculated expected travel time to the destination using the reselected route; and
   provide the updated departure time to the user on the output device, the providing comprising adding or subtracting one or more offset times to or from the departure time resulting in a corresponding number of departure or pre-departure times and providing, to the user, corresponding messages or signals as a current time matches each departure time or pre-departure time.

2. The navigation system according to claim 1, wherein the navigation system is a portable navigation device, and wherein the processing resource and the output device is included in the portable navigation device.

3. The navigation system according to claim 1, wherein the processing resource is configured to monitor the current time, and to provide an alarm signal in dependence upon a comparison between the current time and the departure time.

4. The navigation system according to claim 1, wherein the processing resource is configured to perform one or more of: (i) the determination of expected travel time; (ii) the determination of departure time; (iii) the selection of a route to the destination; and (iv) the selection of the or an offset time, in dependence upon at least one constraint.

5. The navigation system according to claim 4, wherein the at least one constraint comprises a requirement to optimise at least one of: (i) travel time to the destination; and (ii) a requirement to arrive by a required arrival time.

6. The navigation system according to claim 4, wherein the at least one constraint comprises a requirement to depart and/or arrive within at least one time window.

7. The navigation system according to claim 1, wherein the current travel data comprises at least one of traffic data and weather data.

8. The navigation system according to claim 1, wherein the processing resource is configured to update the determination of departure time at last one of: (i) periodically; and (ii) in dependence upon receipt of travel data.

9. A method of operation of a navigation apparatus, comprising:
   receiving user schedule data from at least one user device at the navigation apparatus to obtain destination data representative of a destination and a desired arrival time from the user schedule data;
   determining a plurality of possible routes to the destination and an expected travel time to the destination for each of the plurality of routes in dependence upon historic travel data, wherein said historic travel data comprises measured average speed data at different times;
   selecting a route from the plurality of possible routes to the destination, the selected route having the shortest determined expected travel time to the destination;
   determining a departure time in dependence upon the expected travel time to the destination using the selected route such that the user arrives at the destination by the desired arrival time;
   recalculating the expected travel time for each of the plurality of routes in dependence upon current travel data when the determined departure time is within a predetermined threshold of the current time, wherein the current travel data is indicative of current travel conditions;
   reselecting a route from the plurality of possible routes to the destination, the selected route having the shortest recalculated expected travel time to the destination;
   updating the departure time in dependence upon the recalculated expected travel time to the destination using the reselected route; and
   providing the updated departure time to a user, the providing comprising adding or subtracting one or more offset times to or from the departure time resulting in a corresponding number of departure or pre-departure times and providing, to the user, corresponding messages or signals as a current time matches each departure time or pre-departure time.

10. A non-transitory computer readable medium comprising computer executable instructions to perform, when executed on a computer, a method of operation of a navigation apparatus comprising:
   receiving user schedule data from at least one user device at the navigation apparatus to obtain destination data representative of a destination and a desired arrival time from the user schedule data;
   determining a plurality of possible routes to the destination and an expected travel time to the destination for each of the plurality of routes in dependence upon historic travel data, wherein said historic travel data comprises measured average speed data at different times;

selecting a route from the plurality of possible routes to the destination, the selected route having the shortest determined expected travel time to the destination;

determining a departure time in dependence upon the expected travel time to the destination using the selected route such that the user arrives at the destination by the desired arrival time;

recalculating the expected travel time for each of the plurality of routes in dependence upon current travel data when the determined departure time is within a predetermined threshold of the current time, wherein the current travel data is indicative of current travel conditions;

reselecting a route from the plurality of possible routes to the destination, the selected route having the shortest recalculated expected travel time to the destination;

updating the departure time in dependence upon the recalculated expected travel time to the destination using the reselected route; and providing the updated departure time to a user, the providing comprising adding or subtracting one or more offset times to or from the departure time resulting in a corresponding number of departure or pre-departure times and providing, to the user, corresponding messages or signals as a current time matches each departure time or pre-departure time.

* * * * *